Matsumoto et al.

3,642,374
Feb. 15, 1972

[54] OPTICAL INSPECTING METHOD

[72] Inventors: Kazuya Matsumoto; Takashi Susuki, both of Tokyo, Japan

[73] Assignee: Canon Kabushiki Kaisha, Shimomaruko, Ota-ku, Tokyo, Japan

[22] Filed: Mar. 26, 1970

[21] Appl. No.: 22,776

[30] Foreign Application Priority Data

Mar. 31, 1969 Japan..................................44/24648

[52] U.S. Cl...............................................356/107, 350/3.5
[51] Int. Cl............................................G01b 9/02, G02b 1/05
[58] Field of Search.........................................356/106–113; 350/3.5

[56] References Cited

UNITED STATES PATENTS 1,565,533  12/1925  Twyman et al. ..................356/109

OTHER PUBLICATIONS

"A Difference Grating Interferometer" & R. Kraushaar, Journal of the Optical Society of America Vol. 40, No. 7, pp. 480–481

*Primary Examiner*—Ronald L. Wibert
*Assistant Examiner*—Conrad Clark
*Attorney*—Toren & McGeady

[57] ABSTRACT

An optical inspecting method described in the illuminating wave and a wave under inspection onto an artificially prepared a holographic test plate, and filtering waves coming through the plate to obtain desirable waves.

11 Claims, 2 Drawing Figures

PATENTED FEB 15 1972

INVENTORS
KAZUYA MATSUMOTO
TAKASHI SUZUKI
BY
McGlew & Toren
Attorneys

INVENTORS
KAZUYA MATSUMOTO
TAKASHI SUZUKI
BY
McGlew & Toren
Attorneys

OPTICAL INSPECTING METHOD

BACKGROUND OF THE INVENTION

The present invention relates to improvements in a method for inspecting an optical element such as polished surfaces of glass or striae of the same.

Conventionally, inspection of the polished surface of a lens has been accomplished by providing a test plate for the polished surface, and observing Newton fringes formed between the test plate and the lens. Using this conventional method it is possible to detect how much the polished surface deviates from that of the test plate, but it has such a shortcoming that if the polished surface is of a nonspherical shape, it is difficult to make the test plate.

An object of the present invention is to eliminate such shortcomings. Another object is to improve such an optical inspecting method.

SUMMARY OF THE INVENTION

According to features of the present invention:

The optical inspecting method comprises illuminating an illuminating wave and a wave under inspection onto an artificially prepared a holographic test plate, and filtering waves coming through the plate to obtain desirable waves.

According to another feature of the invention, the holographic test plate is of Fresnel zone type.

According to still another feature of the invention, waves of higher order diffracted from the plate are used as the desirable waves.

According to still another feature of the invention, a wave of zero order from the plate for the illuminating wave and a wave under inspection directing in the direction of the wave of zero order for the illuminating waves are used as the desirable waves.

According to still another feature of the invention, a wave of zero order from the plate for the wave under inspection and a wave diffracted by the plate of the illuminating wave directing in a direction of the wave of zero order from the plate for the wave under inspection are used as the desirable waves.

According to still another feature of the invention, the filtering is performed with an aperture positioned at a focusing position of the desirable waves.

The term "an artificially prepared holographic test plate" in the present invention stands for "a test plate with interference fringes having information of designed values of an optical element."

The term "a holographic test plate of a Fresnel type" in the present invention stands for a rotationaly symmetrical holographic test plate of an on-axis type with one of the following three conditions.

1. a plane wave which is deformed by designed values such as aberration of an optical element, interfere with a spherical reference wave, and
2. a spherical wave, which is deformed by designed values of an optical element, interfere with a plane reference wave,
3. a spherical wave, which is deformed by designed values of an optical element, interfere with a differently powered spherical reference wave.

In these case the holographic test plates resemble an ordinary Fresnel zone plate in their shapes, but differ from the latter plate in their spacings.

The present invention makes it easy to observe a deviation of an optical element from a designed value.

DESCRIPTION OF THE DRAWINGS

The present invention will be described in detail referring to the attached drawings in which.

DESCRIPTION OF THE PREFERRED EMBODIMENTS

Figure 1:
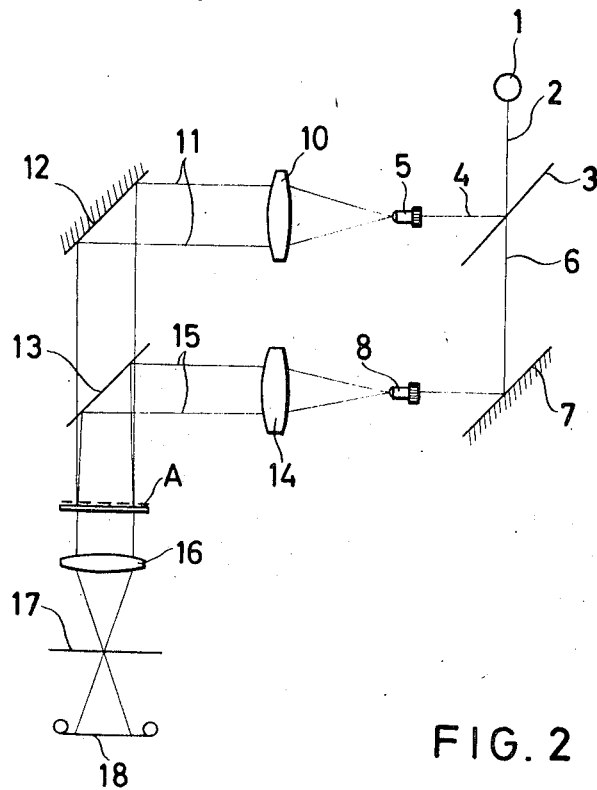
FIG. 1 is a schematic drawing showing an outline of one example of an apparatus for the method of the present invention.

In FIG. 1, laser beam 2 from a source 1 is divided by a half mirror 3, and one divided beam 4 reflected by the mirror 3 enters into a microscopic objective 5, and the other divided beam 6 transmitting through the half mirror 3 enters into a microscopic objective 8 with the aid of a mirror 7. A spherical wave irradiated from the objective 5 is converted to a reference plane wave 11 by a collimator 10, and the plane wave 11 transmits through a half mirror 13 after its reflection by a mirror 12, and then enters into an artificially prepared holographic test plate A. On the other hand, the spherical wave irradiated from the objective 8 enters into a lens under inspection 14, and, effected by the aberration of the lens 14 is converted to spherical wave 15. This wave 15 coming through the lens 14 is reflected by the half mirror 13 and enters into the holographic test plate A.

Of the two waves 11 and 15 entering into the holographic test plate A, after passing through the plate A, the reference plane wave 11 is divided into a number of waves such as a zero ordered plane wave directly passing through the plate A, a first order wave, higher ordered waves, both diffracted by the plate A, and their waves respectively conjugate with the first and higher ordered waves when the plate A exhibits nonlinear characteristics with, for example, rectangular density distribution. The wave 15, after passing through the plate A, also is divided into a zero ordered wave, a first ordered wave, higher ordered waves and waves respectively conjugate with the first and higher ordered waves. Of the number of waves mentioned above, the first ordered wave is diffracted as a plane wave equivalent to the wave 11 if the lens 14 with its features as designed is used.

FIG. 1 shows this case, out of the many waves mentioned above, what should be interfered are, for example, the zero ordered wave that is a plane wave coming through the collimator 10 and passing through the plate A, and the first ordered wave diffracted by the plate A of the wave 15. In order to eliminate the waves other than the two waves to be interfered, a collimator 16 is provided after the plate A and a small aperture 17 is placed for example at the focusing position of the collimator 16, so that the plane wave and such waves as deviate very slightly therefrom are made to pass through the plate A. Thus the two desirable waves interfere with each other to form interference fringes on an observation plane 18. The reason why the plate A is positioned behind the half mirror 13 is to eliminate effects on the inspected results caused by a difference between each of the optical passes of the waves in case the plate A is positioned otherwise. That is because both the reference plane wave 11 from the collimator 10 and the wave 15 pass through the same plate A.

On the observation plane 18, when the lens 14 under inspection and the plate A correspond respectively to each designed values, and the apparatus is arranged in good order, the two waves become spherical waves through the collimator 16, therefore if the mirror 13 is slightly slanted, parallel fringes appear with equal spacings. If the lens 14 deviates slightly from the designed value while the plate A corresponds exactly to the designed value, the fringes are disturbed, thus the polishing error of the lens 14 is detected.

In the above mentioned apparatus as the parallel beam of the laser enters the objective 5, if the focal point, into which the beam concentrates through the objective 8, coincides with the focal point of the lens 14, the wave coming out of the lens 14 becomes a plane wave or one very close to a plane wave, and thus it becomes difficult to separate desirable waves through the plate A for example by means of the small aperture 17. The reasons are as follows. While the wave 15 is diffracted into several waves through the plate A, the several waves are apt to become very close to plane waves. In order to make it possible to select the necessary waves by means of the small aperture 17, the focal point of the laser beam through the objective 8 may be slightly defocused from the focal position of the lens 14, thus the wave from the lens 14 becomes an approximately spherical wave. In this way, all of the waves through the plate A may be made approximately spherical waves, except necessary ones, in case of the apparatus shown in FIG. 1. In this case the focal point to which said waves concentrate through the collimator 16 differs from the focal point of the collimator 16. Therefore, desirable waves are intercepted by the small aperture 17 positioned at the focal point of the collimator 16. A method for defocusing may also be applied in reducing a number of fringes through the plate A to facilitate and simplify the preparation of the artificial holographic test plate.

The greater the degree defocusing, the larger the number of fringes will become. On the other hand, as the degree of defocusing becomes smaller, the waves coming out of the lens 14 becomes closer to plane waves; thus the number of fringes becomes smaller.

Figure 2:
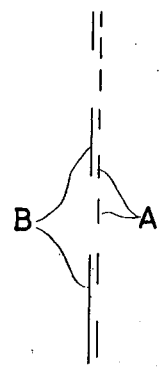
FIG. 2 shows an example of a holographic test plate for the present invention.

FIG. 2, shows illustratively the schematic constructions of two artificially prepared holographic test plates A and B of Fresnel zone type. The twice the number of the fringes are called the number of zones, and said number of zones may be artificially reduced to one by odd numbers such as one-third, one-fifth. . . . The pattern of the plate B of Fresnel zone type, whose number of zones is reduced to one-third of the number of zones of the plate A, is partially shown in FIG. 2. Each zone of the plate B correspond to three narrow zones of the plate A. It is assumed that the light passing through two adjoining zones of the three zones offsets each other, and the light passing through the remaining one zone of the three zones remains alive. The remaining zone corresponds to one of the zones of the plate A of a certain Fresnel zone type, which is not reduced in its number of zones. Therefore, in this case the light source 1, the lens 14 and the plate B of a Fresnel zone type and considered to be placed at such relative positions so as to give the plate A of a Fresnel zone type the similar effects, as given in a case where the plate A is used.

In the apparatus shown in FIG. 1, some modification may be easily made so that a wave coming directly through the plate A of the wave 11 and a higher ordered wave diffracted by the plate A of the wave 15 are made to interfere with each other. For a higher degree of accuracy, the relative positions of the plate A and the lens 14 to the apparatus may be shifted along an optical axis for the lens 14.

Figure 3:
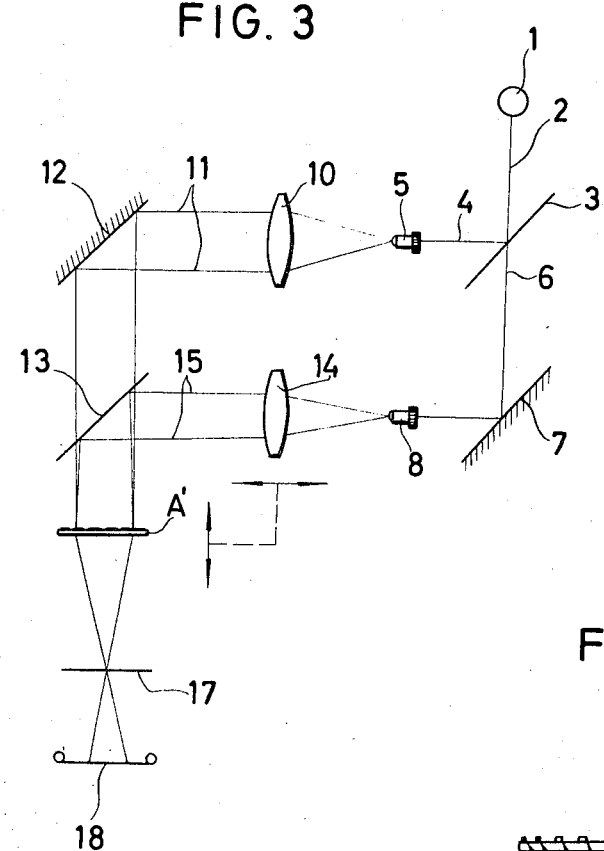
FIG. 3 is a schematic drawing showing a modification of the apparatus shown in FIG. 1.
Figure 4:
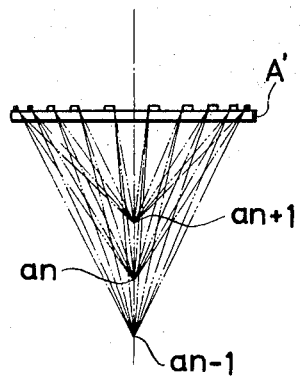
FIG. 4 is a schematic drawing showing each diffracted wave from a holographic test plate of a Fresnel zone type.

Another modification of an apparatus for the present invention is shown in FIG. 3, in which the collimator 16 shown in FIG. 1 is omitted, and an artificially prepared holographic test plate of a Fresnel zone type A' is provided at a corresponding position to the plate A in FIG. 1 so as to make possible an easy separation of desired waves. For this purpose the plate A' is constructed to produce an interference between a spherical reference wave and a wave optical element with a wave corresponding to designed value. FIG. 4 is a schematic drawing showing each diffracted wave from the artificially prepared holographic test plate A' shown in FIG. 3.

In FIG. 4, the focal points $(\alpha n-1)$ $(\alpha n)$ and $(\alpha n+1)$ represent respectively concentrating points of the diffracted spherical waves of the $(\alpha n-1)$th, $(\alpha n)$th and $(\alpha n+1)$th orders of a plane reference wave, wherein $n$ may be any integer.

In the present invention as the interference fringes due to the wave under inspection artificially prepared from the designed value of the polished surface of an optical element, etc., and due to some suitable reference wave, that is a pattern of a holographic test plate is artificially provided, such excellent practical advantages are obtained that preparation of a test plate constructed with aid of an optical master element is not necessary and further preparation of a holographic test plate is easy, therefore even when the polished surface of an optical element is of a complicated structure such as of a spherical structure inspection is easily made, and evaluation of data inspected is simplified and accurate.

A holographic test plate used in the present invention has been described as of transparent material. However it may be of any material.

What is claimed:

1. An optical inspecting method, which comprises directing an illuminating wave and a wave under inspection onto an artificially prepared Fresnel zone type of holographic test plate which has a predetermined optical construction, and filtering two diffracted waves emerging from the artificially prepared holographic test plate by an aperture positioned substantially at a focusing position of the two diffracted waves to obtain desired waves forming a reduced number of fringes.

2. An optical inspecting method according to claim 1, wherein the desired waves are waves of higher order diffracted from the plate.

3. An optical inspecting method according to claim 1, wherein the desired waves constitute a zero order wave, emerging from the plate from the illuminating wave, and the wave under inspection directed in the direction of the zero order wave from the illuminating wave.

4. An optical inspecting method according to claim 1, wherein the desired waves include a zero order wave, emerging from the plate from the wave under inspection, and a wave, diffracted from the plate from the illuminating wave, directed in a direction of the zero order wave emerging from the plate from the wave under inspection.

5. An optical inspecting method as in claim 1, wherein the illuminating wave and the wave under inspection are directed on to an artificially prepared Fresnel zone type of holographic test plate, whose predetermined optical construction is similar to that of a first interferogram formed by the illuminating waves and the wave under inspection.

6. An optical inspecting method as in claim 1, wherein the directing step includes projecting a laser beam onto the optical device to be tested and directing the resulting waveforms in one direction toward the artificially prepared Fresnel zone type holographic test plate, and directing the laser beam to a standard optical device and directing the waveforms emerging therefrom in the same direction as the waveforms from the device to be tested and on to the test plate.

7. An optical inspecting method as in claim 1, wherein the directing step includes projecting a laser beam with an objective through a lens to be tested and transmitting the light emerging therefrom in one direction toward the test plate, and projecting the same laser beam with an objective through a standard lens and transmitting the light emerging therefrom along the same direction toward the plate.

8. An optical inspecting method as in claim 7, wherein the step of filtering includes collimating the waves from the plate in directing them through an aperture so as to cause plane waves and slightly deviating waves to pass therethrough.

9. An apparatus for optical inspection comprising laser means for projecting a laser beam, directing means for projecting at least a portion of the laser beam onto an optical device to be tested, a standard optical device against which the optical device to be tested is to be compared, a second directing means for projecting a portion of the laser beam on to the standard optical device, optical means for directing the waves emerging from the standard optical device and the optical device to be tested in the same direction, an artificially prepared Fresnel zone type of holographic test plate in the path of the wave travelling in the same direction for diffracting the waves, and filtering means in the path of the diffracted waves emerging from said plate for filtering the diffracted waves, said filtering means including an aperture positioned substantially at a focusing position of two of the diffracted waves, an indicator means in the path of the waves passing through the filter for showing fringes.

10. An apparatus as in claim 9 wherein said standard optical device includes a lens.

11. An apparatus as in claim 10 wherein said filtering means includes a collimator for projecting the waves from the plate through the aperture.